United States Patent [19]

Fodor et al.

[11] Patent Number: 5,017,661
[45] Date of Patent: May 21, 1991

[54] PROCESS FOR REDUCING THE LEVEL OF T-BUTYL ALCOHOL (TBA) IN VISBROKEN POLYOLEFINS

[75] Inventors: Lawrence M. Fodor; William R. Coutant, both of Bartlesville, Okla.

[73] Assignee: Phillips Petroleum Company, Bartlesville, Okla.

[21] Appl. No.: 478,340

[22] Filed: Feb. 12, 1990

[51] Int. Cl.$^5$ ............................................. C08F 8/50
[52] U.S. Cl. ................................. 525/344; 525/333.8; 525/363; 525/386; 525/387
[58] Field of Search ................ 525/386, 387, 363, 344

[56] References Cited

U.S. PATENT DOCUMENTS

| | | | |
|---|---|---|---|
| 3,110,708 | 11/1963 | Wisseroth et al. | 525/333.8 |
| 3,144,436 | 8/1964 | Greene et al. | 525/333.8 |
| 3,862,069 | 1/1975 | Cruz, Jr. et al. | 525/333.8 |
| 3,957,737 | 5/1976 | Pautrat et al. | 525/333.8 |

*Primary Examiner*—Bernard Lipman
*Attorney, Agent, or Firm*—Archie L. Robbins

[57] ABSTRACT

Use of strong acidic materials, such as molecular sieves, reduces the level of t-butyl alcohol (TBA) produced during the visbreaking of polyolefins.

8 Claims, No Drawings

PROCESS FOR REDUCING THE LEVEL OF T-BUTYL ALCOHOL (TBA) IN VISBROKEN POLYOLEFINS

BACKGROUND OF THE INVENTION

This invention relates to a new and useful process for reducing the levels of t-butyl alcohol (TBA) produced during the visbreaking of polyolefins.

The visbreaking of polyolefins to improve their rheological properties is well known in the art. Although this process of visbreaking can and does occur naturally at appropriate temperatures, the common and widespread industry practice is to induce and/or accelerate the process by means of suitable chemical reagents. It is also well known in the art that peroxides are the chemical reagents of choice used in the visbreaking process. This is because these peroxides are capable of generating free radicals at the appropriate temperatures and times so as to ensure the production of a uniform product.

The use of peroxides in the visbreaking process is succinctly discussed in Ehrig et al (U.S. Pat. No. 4,707,524): That discussion in Ehrig et al., subtitled Background Art, is hereby incorporated into this application.

It is common knowledge within the plastic industry that 2,5 dimethyl 2,5-bis(t-butylperoxy) hexane, commercially made and sold under the trademark "LUPERSOL 101" by the Lucidol Division of Pennwalt Corporation, is the preferred peroxide for use during visbreaking processes. In spite of its excellent properties and the improved rheological properties of the visbroken polyolefins, Lupersol 101, has some drawbacks. The primary drawback is the production of high levels of t-butyl alcohol. This in turn results in undesirable odor problems, and in some cases prevents the use of such visbroken polypropylene in food areas. Prior to July 1987, the maximum allowable level of t-butyl alcohol in such visbroken polypropylene permissible in food areas was less than 25 ppm. Although the present maximum allowable level of t-butyl alcohol of visbroken polypropylene permissible in food areas has been relaxed to 100 ppm, it is still desirable to eliminate TBA in food areas.

The use of zeolites as sorbents and as catalysts is also known. Starks, (U.S. Pat. No. 3,283,015) discloses the use of zeolites as sorbents to remove alkandiols which are impurities of alkanols. The use of molecular sieves/zeolites as catalysts is also disclosed in the following references—R. Barrer, Zeolites and Clay Minerals as Sorbents and Molecular Sieves p. 5-14 (1978); Vol. 15. Kirk-Othmer, Encyclopedia of Chemical Technology p. 650-651 3 ed. (1981). (Discussion on Molecular Sieves referenced pages on Acidic Zeolites and Zeolite Catalyst Applications).

The elimination and/or reduction of the t-butyl alcohol produced during the visbreaking of polyolefins continues to be of interest to the plastic industry. Ehrig et al represents one such attempt. However, the Ehrig et al method merely avoids the problem by resorting to the usage of other peroxides—"LUPERSOL 553 and "ESPERAL 529"—other than "LUPERSOL 101". (See lines 20-24 column 2 of U.S. Pat. No. 4,707,524) It is uncertain whether this process is economically desirable considering cost and availability of substitute peroxides and adjustments in process conditions and equipment that such substitutions may necessitate. It is also uncertain how many of the improved rheological properties of the visbroken polypropylene are compromised by such substitutions. For example, in Table II, page 3, of Ehrig et al; it is observed that the melt flow (MF) of resins treated with other peroxides is significantly less than that treated with Lupersol 101.

The present invention represents a new and significant improvement in the visbreaking of polyolefins. It permits the continuous and preferred industry use of Lupersol 101 as the peroxide of choice, while significantly lowering the undesired production of t-butyl alcohol that is an inherent by-product of the process.

SUMMARY OF THE INVENTION

It is a general object of this invention to provide a significantly new and improved process for the production of controlled rheology polyolefins.

It is also an object of this invention to provide for such a process in a manner that permits and facilitates the continuous use of 2,5-dimethyl- 2,5-bis(t-butylperoxy)hexane as the peroxide of choice for visbreaking polypropylene.

A further object of this invention is to provide a process for reducing and/or eliminating the undesired t-butyl alcohol produced during visbreaking of polyolefins using "LUPERSOL 101" or other suitable peroxides capable of generating t-butyl alcohol.

In accordance with this invention, a process is provided for visbreaking a polyolefin using a peroxide capable of generating free t-butyl alcohol groups, in the presence of a strong acidic material at a temperature of 170° C. to 350° C.

DETAILED DESCRIPTION OF THE INVENTION

The present invention is based on the discovery that strong acidic materials, such as acidic zeolites, are useful in reducing the level of t-butyl alcohol (TBA) produced during the visbreaking of polyolefins using peroxides capable of generating t-butyl alcohol.

This invention is applicable to the visbreaking of any homopolymer or copolymer of $C_2$-$C_{18}$ mono-1-olefins. Preferred, however, are homopolymers of propylene, 4-methylpentene-1 and 3-methylbutene-1 and additionally, copolymers of the above three monomers with minor amounts of other 1-olefins. Most particularly preferred is polypropylene.

The term strong acidic material includes strong inorganic acids such as nitric acid and hydrochloric acid. Sulfuric acid is the preferred member of this group. The sulfuric acid is more effective when used in combination with diatomaceous earth. Examples of strong organic acids useful as the strong acidic material in this invention include trichloracetic acid, trifluoroacetic acid, fluorinated alkyl sulfonic acids, aryl sulfonic acids and acidifeed "NAFION" ® resins. Preferred, however, are solid strong acid materials such as acidic zeolites. Such acidic zeolites include but are not limited to Ultra Stable Y (USY) zeolites and Rare Earth Exchanged Y (REY) zeolites. LZY 82 is an example of such an acidic zeolite. Most particularly preferred, though, are acidic molecular sieves.

Usually, "LUPERSOL 101" is the peroxide used for visbreaking polyolefins. Nevertheless, this invention applies not only to "LUPERSOL 101"; it covers all peroxides potentially useful to induce visbreaking and having the capability to generate free t-butyl alcohol (TBA) fragments during the visbreaking process. Examples of such other peroxides are 2,5-dimethyl-2,5-bis(t-butyl peroxyl)hexyne-3 made and sold under the trademark "LUPERSOL 130" by Pennwalt Corporation, and di-t-butyl peroxide.

The temperature for carrying out this invention depends on the scope of its application. Typically, the temperature generally ranges from about 170° C. to about 350° C., with a preferred range of from about 200° C. to about 300° C., and a distinctly preferred range of from about 200° C. to 250° C. Generally, the amount of peroxide to be added is an effective amount needed to obtain the degree of visbreaking desired. Stated quantitatively, this amount is generally in the range of about 0.01 to about 0.25 weight percent. More preferably, the peroxide is in the amount of about 0.05 to about 0.15 weight percent, and most preferably in the amount of from about 0.05 to about 0.10 weight percent.

Similarly, an effective amount of strong acidic material is needed to contact with the peroxide. It has been found that a directly proportional relationship generally exists between the amount of strong acidic material needed to the quantity of peroxide used. Stated quantitatively, the approximate ratio of these ingredients is about 4:1 to about 0.25:1 weight ratio of the acidic material to the peroxide. Most preferable is a weight ratio of 2:1 to about 0.5:1 of acidic material to peroxide.

Any method and/or device known in the art for visbreaking is encompassed by this invention.

The following illustrative examples further detail the various aspects of this invention.

EXAMPLE I

Polypropylene, made by Phillips Petroleum Company, marketed under the trademark "MARLEX®" (melt flow (MF) 4g/10 min. at 230° C. and 2.16 Kg) was used. The polypropylene was blended with a peroxide, an antioxidant, and with or without molecular sieve in a Henchel high speed mixer. The composition of the various blends is as shown in Table I below. The peroxide used was Lupersol 101 that was gradually added to the mixture using a syringe. The antioxidants used were butylated hydroxytoluene (BHT) and zinc stearate (corrosion inhibitor and lubricant). All blends were made up to 40 lbs. by the addition of a sufficient quantity of polypropylene.

TABLE 1

| Polypropylene Blends Used in Visbreaking | | | | |
|---|---|---|---|---|
| Blend | Lupersol 101 (g) | BHT (g) | Zinc Stearate (g) | Molecular Sieve (g) |
| A | 14.5 | 21.8 | 16.3 | — |
| B | 13.4 | 21.8 | 16.3 | — |
| C | 12.0 | 21.8 | 16.3 | — |
| D | 10.5 | 21.8 | 16.3 | — |
| E | 14.5 | 21.8 | 16.3 | 9.1 |
| F | 14.5 | 21.8 | 16.3 | 18.2 |

The polypropylene blend was transferred to a size 2 Farrel Continuous Mixer (2FCM) that was heated (with a ribbon discharge temperature of 200°–230° C.) to melt the polymer blend followed by continuously feeding to a 3 1/2 in. hot melt extruder (HME) that was heated, employing hot oil, at a set point of 230° C. with die temperature set at 250° C. The feed rate was maintained at 70 Kg/hr. The actual conditions are summarized as shown in Table 2 below.

TABLE 2

| | | Hot Melt Extrusion of Polypropylene | | |
|---|---|---|---|---|
| | | | HME | |
| Blend | FCM Ribbon (discharge temp (°C.) | Product Rate (Kg/hr.) | Melt Discharge Temp. (°C.) | Die Temp. (°C.) |
| A | 201 | 70.0 | 205 | 250 |
| B | 211 | 69.3 | 210 | 250 |
| C | 221 | 69.5 | 214 | 250 |
| D | 226 | 68.0 | 217 | 250 |
| E | 200 | 71.0 | 209 | 250 |
| F | 200 | 69.0 | 208 | 250 |

The TBA content was measured for the extrudates. The respective TBA levels of the various blends (A–F) were as shown in Table 3 below.

TABLE 3

| TBA Content of Visbroken Polypropylene Fluff | | |
|---|---|---|
| Blend | TBA (ppm) | MF (g/100 min at 230° C. and 2:16 Kg) |
| A | 66 | 42 |
| B | 58 | 40 |
| C | 55 | 43 |
| D | 40 | 48 |
| E | 46 | 39 |
| F | 28 | 37 |

The results clearly show that, the TBA content decreased significantly from a high of 66 ppm (blend A) to 46 ppm (blend E) and 28 ppm (blend F) with 0.05 wt. % and 0.10 wt. %, respectively, of molecular sieve incorporated. Blends A, E, and F had the same additive content except for the molecular sieve. Although blend D shows a TBA content of 40 ppm, it should be noted that blend D had 23% less Lupersol 101 than blend A. Additionally a 26 degree higher temperature was used with Blend D, which promotes both thermal visbreaking of the polymer and the thermal decomposition of the resulting TBA. Because the addition of molecular sieve reduced the TBA content and did not significantly alter the polymer's rheology, it is beneficial to employ molecular sieve in the visbreaking of polyolefins.

While this invention has been described in detail for the purpose of illustration, it is not to be construed as limited thereby but is intended to cover all changes and modifications within the spirit and scope thereof.

That which is claimed is:

1. In a process for visbreaking polymers of at least one mono-1-olefin using at least one peroxide capable of generating t-butyl alcohol, the improvement comprising carrying out the visbreaking in the presence of a strong acidic material selected from the group consisting of acidic zeolites and sulfuric acid/diatomaceous earth; at a temperature within the range of 170° C. to 350° C.

2. A process as in claim 1 wherein said peroxide is 2,5-dimethyl-2,5-bis(t-butylperoxy)hexane.

3. A process as in claim 1 wherein said mono-1-olefin is polypropylene.

4. A process as in claim 1 wherein said strong acidic material is a normally solid material.

5. A process as in claim 1 wherein said strong acidic material is synthetically prepared to exist in a solid state.

6. A process as in claim 1 wherein said acidic zeolite is an acidic molecular sieve.

7. A process as in claim 1 wherein the temperature is in the range of 200°C. to 250° C.

8. A process for the reduction of t-butyl alcohol produced during visbreaking comprising: melt blending polypropylene under visbreaking conditions of 200° C. to 250° C. in the presence of 2,5-dimethyl-2,5-bis(t-butylperoxy)hexane and an acidic molecular sieve.

* * * * *